United States Patent [19]
Raidel

[11] 3,918,738
[45] Nov. 11, 1975

[54] VEHICLE SUSPENSION ASSEMBLY WITH TORQUE PLATE

[76] Inventor: John E. Raidel, Rte. 9, Box 400-M, Springfield, Mo. 65804

[22] Filed: July 1, 1974

[21] Appl. No.: 484,761

[52] U.S. Cl. .......................... 280/124 R; 267/21 A
[51] Int. Cl.² ........................................ B60G 11/24
[58] Field of Search..... 267/21 A, 21 R; 280/124 R, 280/124 F

[56] References Cited
UNITED STATES PATENTS

| | | |
|---|---|---|
| 3,277,975 | 10/1966 | Van Winsen.................... 280/124 R |
| 3,481,623 | 12/1969 | Campbell......................... 280/124 R |
| 3,669,467 | 6/1972 | Dunlap............................ 280/124 R |

*Primary Examiner*—Philip Goodman
*Attorney, Agent, or Firm*—Rogers, Ezell & Eilers

[57] ABSTRACT

A vehicle suspension assembly comprising a torque plate, means for pivotally mounting the forward end of the torque plate from the vehicle chassis, means for mounting the rearward end of the torque plate to an axle of the vehicle, and resilient means mounted between the axle and the vehicle chassis.

10 Claims, 8 Drawing Figures

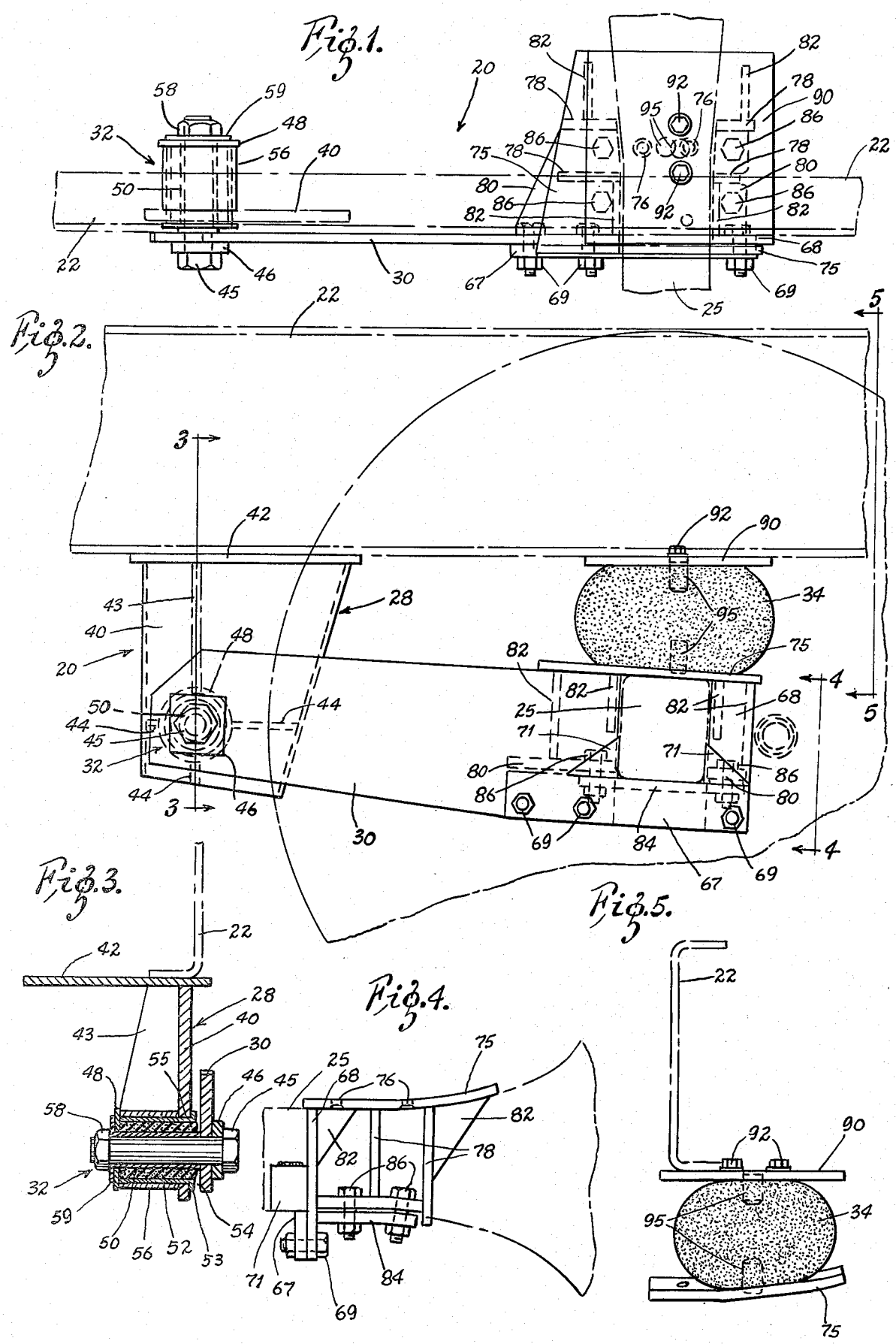

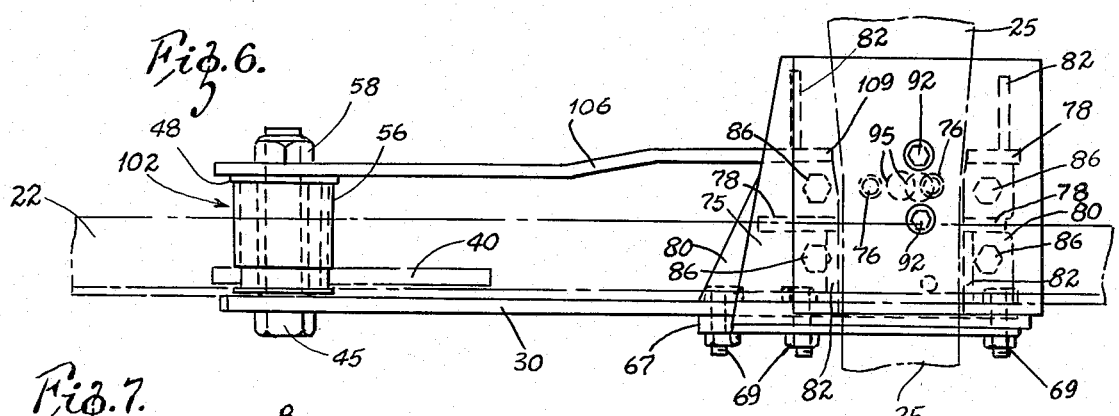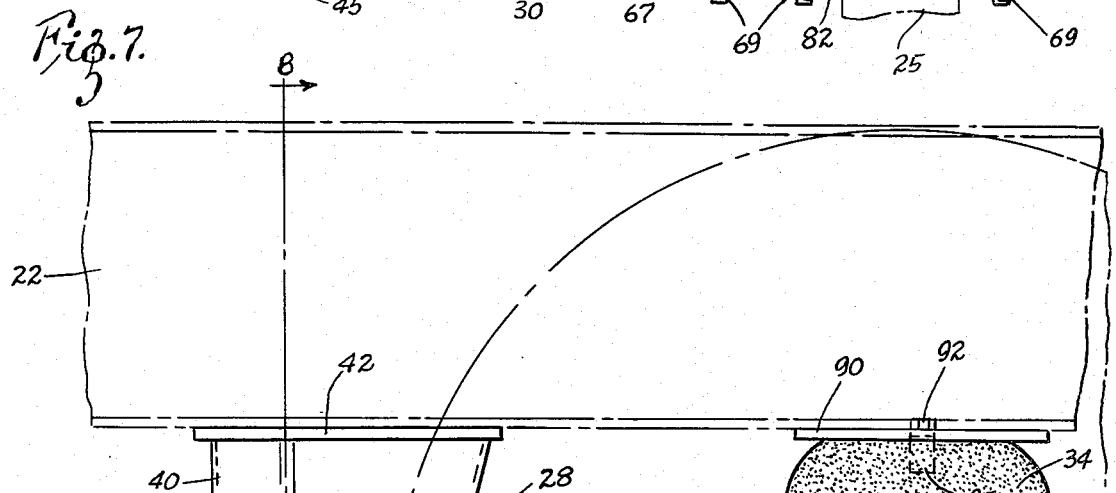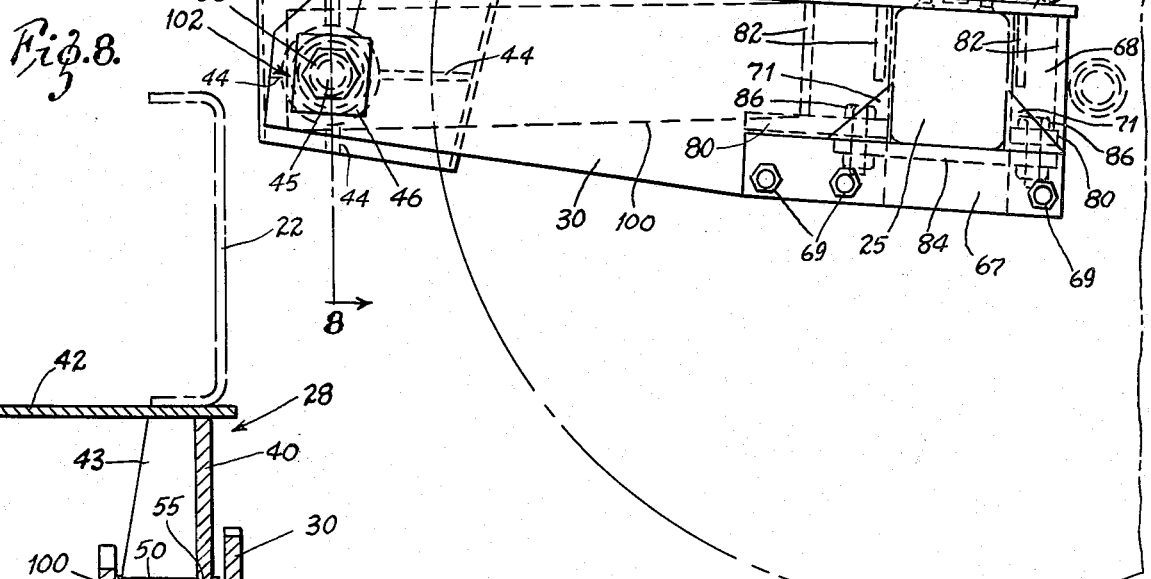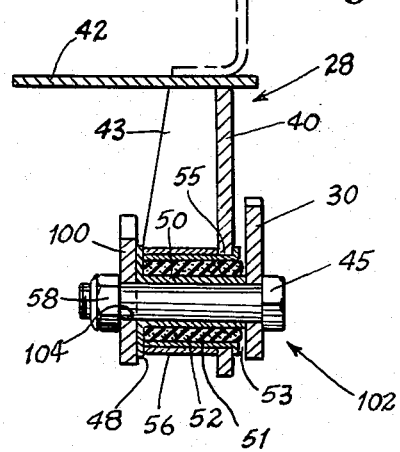

VEHICLE SUSPENSION ASSEMBLY WITH TORQUE PLATE

SUMMARY OF THE INVENTION

This invention relates to a vehicle suspension assembly, and particularly such an assembly having a torque plate that provides limited side flexing to allow for proper wheel tracking, yet provides stability under vehicle load and braking.

The suspension assembly of this invention generally comprises a torque plate, a bushing assembly for pivotally mounting the torque plate at its forward end from the vehicle chassis, means for mounting the rearward end of the torque plate to a vehicle axle, and resilient means such as a solid rubber ball mounted between the vehicle axle and the chassis.

The torque plate is preferably of spring steel and oriented with its width dimension vertically to allow limited side flexing for proper wheel tracking as well as limited flexing in torsion as where one end of the axle moves up or down relative to its other end. The bushing assembly for mounting the forward end of the torque beam is also designed to allow limited side and torsion or twisting movement of the torque plate at the bushing assembly.

In another embodiment of the invention a second torque plate is provided between the bushing assembly and the vehicle axle, which second torque plate is oriented generally parallel to but spaced from the first torque plate. Two torque plates are used on vehicles that have exceptionally high axle torque.

The suspension assembly of this invention is exceptionally stable, yet provides a comfortable ride, and does so with relatively few parts and in a relatively small space.

Thus, the primary objects of this invention are to provide a vehicle suspension assembly that utilizes a torque plate design that provides limited sideways and torsion flexibility for proper wheel tracking and to accommodate vertical movement of one side of the axle relative to its other side, and which is accomplished with relatively few parts and in a relatively small space.

These and other objects of the invention will become apparent from the drawings and detailed description to follow.

DESCRIPTION OF THE DRAWINGS

FIG. 1 is a top plan view of a vehicle suspension assembly of this invention;

FIG. 2 is a side elevation view of the suspension assembly of FIG. 1;

FIG. 3 is a view in section taken generally along the line 3—3 of FIG. 2;

FIG. 4 is a view taken generally along the line 4—4 of FIG. 2;

FIG. 5 is a view taken generally along the line 5—5 of FIG. 2;

FIG. 6 is a top plan view of another embodiment of the suspension assembly of this invention;

FIG. 7 is a side elevation view of the embodiment of FIG. 6; and

FIG. 8 is a view in section taken generally along the line 8—8 of FIG. 7.

DETAILED DESCRIPTION OF PREFERRED EMBODIMENTS

Referring to FIGS. 1 through 5 of the drawing, there is shown a suspension assembly 20 of this invention using a single trailing torque plate as will be described. The suspension 20 is mounted to a side member 22 of the vehicle chassis. The axle 25 of the vehicle is mounted to the suspension below the vehicle chassis in a manner to be described.

It is to be understood that the suspension assembly 20 is duplicated on both sides of the chassis with the axle 25 as well as the vehicle chassis being similarly connected to both assemblies. It is further to be understood that more than one suspension assembly may be mounted on each side of the chassis such as where multiple axles are used. Because each of the assemblies of this invention is identical, only a single left side assembly will be described, so that in viewing FIG. 2, forward motion of the vehicle is to the left.

The principal components of the suspension assembly 20 comprise a hanger bracket 28 suspended from the side member 22, a torque plate 30 having its forward end pivotally connected by means of a bushing assembly 32 to the hanger bracket 28 and its rearward end attached to the vehicle axle 25, and an elastomer ball 34 mounted between the vehicle axle 25 and the vehicle chassis.

The hanger bracket 28 comprises a vertical plate 40 attached at the top to a horizontal plate 42 which is mounted to the side member 22 of the vehicle chassis. A reinforcing gusset 43 and other gussets 44 add support to the bracket.

The bushing assembly 32 includes a bolt 45, the shank of which extends through a hole in a plate 46, through a hole located at the forward end of the torque plate 30, and through a hole in another plate 48. A sleeve 50 surrounds the shank of the bolt 45 and a rubber bushing 51 surrounds the sleeve 50. An outer sleeve 52 surrounds the bushing 51, the sleeve 52 being slightly shorter than the sleeve 50 and having an annular shoulder 53 at its outer end that is spaced somewhat as shown at 54 from the torque plate 30. The vertical plate 40 of the hanger bracket 28 has a hole 55 near its lower end with a sleeve member 56 of the same diameter extending inwardly from the hole. The sleeve member 56 is attached to the plate 40 and also to the gusset 43 such as by welding. The sleeve 52 extends through the hole 55 and sleeve member 56 with the shoulder 53 against the outer surface of the plate 40. The plate 48 is sufficiently large to cover the sleeve member 56. A nut 58 and washer 59 are secured at the threaded end of the bolt 45 to hold the bushing assembly 32 in place.

The torque plate 30 extends rearwardly from the hanger bracket 28 and is oriented with its width dimension vertically. It is made of spring steel and is purposely not reinforced in the horizontal or side direction relative to motion of the vehicle so as to allow side flexing in that direction to provide proper wheel tracking. Not only does the torque beam itself have flexibility in the horizontal direction, but the bushing assembly 32 with the rubber bushing 51 allows the rearward end of the torque plate to float so as to provide universal movement. This is so because the torque plate 30 is not only allowed to pivot about the bushing assembly 32 as the axle 25 moves up and down under load, but is also allowed some degree of movement horizontally due to the resiliency of the bushing 32. This is so because of the spacing 54 between the torque plate 30 and the shoulder 53 of the sleeve 52 as shown in FIG. 3.

It should further be noted that the torque plate 30 flexes in torsion upon oscillation of the vehicle axle, such as where the wheel on one side of the axle 25 moves up or down relative to the wheel on its other side. This type of axle oscillation is also accommodated in part by the resilient bushing assembly 32 which, to the extent provided by the spacing 54, allows limited twisting or rotation of the torque plate 30 about its longitudinal axis at the location of the bushing assembly 32.

The rearward end of the torque plate 30 terminates at the forward side of the axle 25 which is shown to have a rectangular cross section. A truss plate 67 is mounted beneath the axle 25 with one end bolted to the torque plate 30 and its other end bolted to a vertical plate 68 at the rearward side of the axle 25 by means of nut and bolt assemblies 69. Triangular blocks 71 are welded to opposite sides of the axle 25 and to the truss plate 67 to secure the truss plate to the axle.

The elastomer ball 34 is made of solid rubber and is mounted at its bottom end to the axle 25 by means of a plate 75, curved as best shown in FIGS. 4 and 5 to fit the contour of the axle 25. The plate 75 has holes 76 which receive flat head screws which extend into the ball 34 to secure the ball to the plate 75. Vertical reinforcing plates 78 are secured at their tops to the plate 75 and extend downwardly on opposite sides of the axle 25. Horizontal plates 80 are secured to the bottom ends of the reinforcing plates 78 on opposite sides of the axle 25 such that the bottom surfaces of the plates 80 are slightly above the lower surface of the axle 25. The top of the torque plate 30 is secured such as by welding to the plate 75, and triangular gussets 82 are provided as shown to add further support. Thus, the plates 30, 75, 78, 80, and 82 are secured together such as by welding to form an integral structure that fits downwardly over the top and sides of the axle 25.

A bottom plate 84 oriented generally horizontally extends beneath the bottom side of the axle 25 in back of the torque plate 30, and is secured to the plates 80 on opposite sides of the axle 25 by means of nut and bolt assemblies 86 to firmly mount the ball 34 to the axle 25.

The upper end of the ball 34 is mounted to the chassis member 22 by means of a top plate 90 which is bolted to the top of the ball 34 by means of cap screws and lock washers 92. The plate 90, in turn, is attached to the chassis member 22 such as by welding. The plates 75 and 90 have pins 95 which extend into holes in the ball 34 to help hold the ball in proper alignment.

In FIGS. 6 through 8 of the drawing there is shown another embodiment of this invention wherein two torque plates are used instead of one as shown in the first-described embodiment.

Thus, there is provided a second torque plate 100 oriented in the same manner but spaced inwardly from the torque plate 30. The torque plate 100 is mounted at its forward end to a bushing assembly 102 which is identical to the bushing assembly 32 except that the bolt 45 extends through a hole 104 at the forward end of the torque plate 100 which is substituted for the plate 59 shown in FIG. 3 of the first-described embodiment. The torque plate 100 has a slight double bend about midway of its length as shown at 106, and is secured at its rearward end, such as by welding, to the plates 75 and 80 and the gusset 82.

OPERATION

The operation of the suspension 20 is apparent. As the load on the vehicle changes, the resilient rubber ball 34 is flattened or extended accordingly to resiliently support the load. As the vehicle turns corners or travels around curves, a side load is applied to the vehicle axle and causes the torque plate 30 to flex so as to maintain proper wheel tracking. Not only does the torque plate 30 flex, but the bushing assembly 32 further allows limited resilient side movement of the plate 30. The flexibility of the plate 30 and the resiliency of the bushing 32 also allow the plate 30 to rotate about its longitudinal axis and move in torsion, as would occur from oscillation of the vehicle axle as where one end of the axle moves up or down relative to its other end.

The embodiment of FIGS. 6 through 8, wherein a second torque plate is used, operates in the same manner but is used on vehicles that produce exceptionally high torque loads on the axle.

The torque plate construction of the suspension assembly of this invention makes it possible to accomplish these results with relatively few parts and in a relatively small space.

Various changes and modifications may be made in this invention, as will be readily apparent to those skilled in the art. Such changes and modifications are within the scope and teaching of this invention as defined by the claims appended hereto.

What is claimed is:

1. A vehicle suspension comprising a flexible torque plate, means associated with the vehicle chassis for pivotally mounting the forward end of the torque plate from the chassis, means for mounting the rearward end of the torque plate to an axle of the vehicle, said torque plate being oriented to allow limited side flexing under vehicle loading, an elastomeric spring, and means for mounting the elastomeric spring between the axle and vehicle chassis near the rearward end of the torque plate, said torque plate being permitted to flex under side vehicle load subject to restraints imposed by said elastomeric spring, and being permitted to move in torsion about its longitudinal axis upon oscillation of the vehicle axle relative to the chassis as occurs where one end of the axle moves up or down relative to its other end.

2. The suspension assembly of claim 1 wherein the torque plate is made of spring steel.

3. The suspension assembly of claim 1 wherein the resilient means is a solid rubber ball.

4. The suspension assembly of claim 1 wherein the pivotally mounting means at the forward end of the torque plate further comprises a bushing assembly having resilient bushing means therein permitting limited resilient side movement of the torque plate as where the vehicle wheel attached to the axle tracks around turns, and resilient osciallation of the vehicle axle relative to the chassis as occurs where one end of the axle moves up or down relative to its other end.

5. The suspension assembly of claim 1 further comprising a second torque plate spaced from the other torque plate, means associated with the vehicle chassis for pivotally mounting the forward end of the second torque plate from the chassis, and means for mounting the rearward end of the second torque plate to the vehicle axle.

6. The suspension assembly of claim 5 wherein said torque plates are oriented generally parallel to each other and with their width dimensions vertically.

7. The suspension assembly of claim 6 wherein the torque plates are made of spring steel.

8. The suspension assembly of claim 7 wherein the resilient means is a solid rubber ball.

9. The suspension assembly of claim 5 wherein the pivotally mounting means at the forward ends of the torque plates comprise a bushing assembly, means for pivotally mounting the forward ends of the torque plates to the bushing assembly in spaced relation, the bushing assembly having resilient bushing means therein permitting limited resilient side movement of the torque plates as where the vehicle wheel attached to the axle tracks around turns, and resilient oscillation of the vehicle axle relative to the chassis as occurs where one end of the axle moves up or down relative to its other end.

10. A vehicle suspension assembly comprising a flexible torque plate of spring steel, resilient bushing means associated with the vehicle chassis for pivotally mounting the forward end of the torque plate from the chassis, the torque plate being oriented with its width dimension vertically to allow limited side flexing under the vehicle load, means for mounting the rearward end of the torque plate to an axle of the vehicle, a solid rubber ball, and means for mounting the ball between the axle and vehicle chassis at a location near the rearward end of the torque plate, said torque plate being permitted to flex under side vehicle load subject to restraints imposed by said elastomeric spring, and being permitted to move in torsion about its longitudinal axis upon oscillation of the vehicle axle relative to the chassis as occurs where one end of the axle moves up or down relative to its other end.

* * * * *